United States Patent
Grundhoefer et al.

(10) Patent No.: US 12,184,974 B1
(45) Date of Patent: Dec. 31, 2024

(54) ACTIVITY-DRIVEN USE-CASE SPECIFIC CAMERA PROPERTIES SELECTION

(71) Applicant: Apple Inc., Cupertino, CA (US)

(72) Inventors: Anselm Grundhoefer, Campbell, CA (US); Ivan Kolesov, Mountain View, CA (US); Sivalogeswaran Ratnasingam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/945,423

(22) Filed: Sep. 15, 2022

Related U.S. Application Data (60) Provisional application No. 63/247,948, filed on Sep. 24, 2021.

(51) Int. Cl.
*H04N 23/667* (2023.01)
*H04N 23/61* (2023.01)

(52) U.S. Cl.
CPC .......... *H04N 23/667* (2023.01); *H04N 23/61* (2023.01)

(58) Field of Classification Search
CPC .................................................. H04N 23/667
USPC ...................................................... 348/222.1
See application file for complete search history.

(56) References Cited

U.S. PATENT DOCUMENTS

| | | |
|---|---|---|
| 10,051,142 B1 | 8/2018 | Villena et al. |
| 2012/0236173 A1 | 9/2012 | Telek et al. |
| 2015/0138396 A1* | 5/2015 | Sako ............ H04N 23/62 348/231.6 |
| 2016/0125655 A1 | 5/2016 | Tian et al. |
| 2016/0191812 A1* | 6/2016 | Tsubusaki ........ H04N 23/69 348/240.1 |
| 2016/0337827 A1 | 11/2016 | Bjontegard |
| 2018/0041696 A1* | 2/2018 | Balasubramanian .. H04N 23/62 |
| 2019/0286413 A1* | 9/2019 | Hansson ............ G06F 3/167 |
| 2019/0379818 A1 | 12/2019 | Brook |
| 2020/0186375 A1 | 6/2020 | Faulkner |
| 2020/0322530 A1 | 10/2020 | Choi et al. |

* cited by examiner

*Primary Examiner* — Joel W Fosselman
(74) *Attorney, Agent, or Firm* — Thompson Hine LLP (57) ABSTRACT

Various implementations disclosed herein include devices, systems, and methods that obtain sensor data from one or more sensors in a physical environment, and a context is determined based on the sensor data, where the context includes a location of the physical environment and an occurrence of an activity in the physical environment. Camera parameters are selected based on historical parameter data identified based on the context, where the historical parameter data is identified based on camera parameters previously used in the location during prior occurrences of the activity. Then, a camera is configured to capture an image using the selected camera parameters in the location during the occurrence of the activity. In some implementations, the adjusted camera parameters are selected based on context and shared information from a different electronic device regarding camera parameters that were used in the same physical location and during the same activity.

20 Claims, 7 Drawing Sheets

FIGURE 7

ACTIVITY-DRIVEN USE-CASE SPECIFIC CAMERA PROPERTIES SELECTION

CROSS-REFERENCE TO RELATED APPLICATIONS

This Application claims the benefit of U.S. Provisional Application Ser. No. 63/247,948 filed Sep. 24, 2021, which is incorporated herein in its entirety.

TECHNICAL FIELD

The present disclosure generally relates to electronic devices that capture images and, in particular, to systems, methods, and devices that capture images at a particular location for a particular purpose.

BACKGROUND

On an electronic device that has an image sensor such as a camera, the camera and image processing components are significant power consumers of the electronic device. Accordingly, there exists a need to complete image-requiring tasks at the electronic device without incurring delays or unnecessary power consumption.

SUMMARY

Various implementations disclosed herein include devices, systems, and methods that adjust camera parameters based on context and historical information. In some implementations, the context includes a location of the physical environment and an occurrence of an activity in the physical environment. Camera parameters include exposure time, resolution, bit depth, field of view, read out mode, number of frames, image processing algorithms, etc. The camera parameters may be modified for a particular purpose (e.g., associated with the user's identified activity). The camera parameters may be modified for reducing power consumption or image processing resource usage. Context may be determined based on sensor data that identifies where the user is, what the user is doing (e.g., sitting, walking, standing, etc.), what the user is looking at, etc. In some implementations, the adjusted camera parameters are selected based on historical information regarding camera parameters that were used in the same physical location and during the same activity.

In some implementations, the adjusted camera parameters are selected based on context and shared information regarding camera parameters that were used by other electronic devices in the same physical location and during the same activity. The shared information is based on shared parameter data obtained by a first electronic device from a second electronic device that captured one or more camera images at the location during the occurrence of the activity or other occurrences of the activity.

In general, one innovative aspect of the subject matter described in this specification can be embodied in methods that include the actions of obtaining sensor data from one or more sensors in a physical environment, and determining a context based on the sensor data, where the context includes a location of the physical environment and an occurrence of an activity in the physical environment. In some implementations, image sensor parameters are selected based on historical parameter data identified based on the context, where the historical parameter data is identified based on image sensor parameters previously used in the location during prior occurrences of the activity. Then, an image sensor is configured to capture an image using the selected image sensor parameters in the location during the occurrence of the activity.

In general, one innovative aspect of the subject matter described in this specification can be embodied in methods that include the actions of obtaining sensor data from one or more sensors in a physical environment, and determining a context based on the sensor data, where the context includes a location of the physical environment and an occurrence of an activity in the physical environment. In some implementations, image sensor parameters are selected based on shared parameter data obtained from a second electronic device that captured one or more images at the location during the occurrence of the activity or other occurrences of the activity, where the shared parameter data of the second electronic device used to select the image sensor parameters is identified based on the context. Then, an image sensor is configured to capture an image using the selected image sensor parameters in the location during the occurrence of the activity.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that use context and activity to understand how to adjust camera parameters for an identified task. Context includes a location of the physical environment and an occurrence of an activity in the physical environment. The context of the location of the physical environment includes additional location-specific information including time of day, time of year, weather conditions, or state of illumination source (e.g., light on/off, window open/closed), etc. For example, context is determined based on sensor data, e.g., identifying where the user is, what the user is doing (walking, standing, etc.), what the user is looking at, etc. The camera parameters may be adjusted for a particular purpose (e.g., associated with the user's identified activity) while reducing power consumption or processing resource usage. In some implementations, the camera parameters are adjusted based on context and historical information. For example, based on determining that the user is in a particular room doing a particular activity, historical information about camera parameters that worked or did not work in that particular room for that particular purpose are used. The historical information may be from a prior session, e.g., a prior day, a prior year, etc.

In some implementations, the camera parameters are adjusted based on context and externally provided information (e.g., from other users or suggested by third parties such as venue owners). For example, based on determining that the user is in a particular room doing a particular activity, information about camera parameters used by other users in a similar context or the same context (e.g., at the same or prior times) is used to adjust camera parameters.

In some implementations, the electronic device will include a plurality of sensors that can be used for understanding the context in which a user of the electronic device acts. In some implementations, understanding the context includes understanding the physical environment (e.g., location, brightness), understanding the activity of the user (e.g., amount of motion, walking/sitting), understanding the intent of the user (e.g., from user actions), or combinations thereof.

In some implementations, camera parameters for an image-requiring task of the electronic device are adjusted based on the context to improve the user experience. The camera parameters for the electronic device are adjusted to reduce power consumption, increase responsiveness, and decrease overall time to accomplish (e.g., latency) the intended image-requiring task. In some implementations, the camera parameters are adjusted to increase the probability of accomplishing the task so that the user experience is improved or maximized (e.g., accuracy of a computer vision algorithm, responsiveness and battery life).

In some implementations, users in the same physical environment may adjust camera parameters differently based on robustly identifying the context and configuring or pre-configuring the camera based on that context. For example when there is a QR code in the physical environment and the user speaks an audible command to scan the QR code, understanding the context of the physical environment and the user activity changes how the electronic device operates a camera to best fit the user experience.

In this example, decoding an image of a QR code is more sensitive to motion blur than to noise. Further, the user experience of decoding the QR code is preferably performed by capturing a reduced number of images of the QR code (e.g., as few as possible, without failing to capture a decodable image) to reduce power consumption, increase responsiveness, and decrease overall latency for the intended task. In other words, decoding the QR code captures as few images of the QR code as possible, without failing to capture a decodable image of the QR code, which would result in additional camera actions (e.g., delay) to capture and analyze more images of the QR code.

Thus, when the task is reading a QR code, and the user is determined to be walking, the camera will experience motion and accordingly the exposure times of the camera are lowered for image captures, which results in noisy images with reduced motion blur, to capture a decodable image of the QR code. Alternatively, if environmental conditions were the same except the user was sitting, the camera will experience very little motion and accordingly the exposure times of the camera are increased to improve the quality (e.g., reduced noise) of the obtained images, which also results in a decodable image of the QR code. In the sitting-user example, the risk of motion blur or detected motion blur in the image(s) of the scanned QR code is reduced so that the higher quality images are captured. In such QR scanning tasks, an exposure time is desired that is the optimum tradeoff between noise and motion blur based on the context.

Thus, in another example, when the context identifies that the user is standing still, has a bright illumination level, and the QR code is known to be 2 feet directly in front of the user, the camera properties can be adjusted to a capture single image with a high likelihood of sufficient image quality (e.g., very little noise, good contrast, accurate color detection, no motion blur) to decode the QR code.

In some implementations, various properties or parameters of the camera of the electronic device are adjusted. For example, exposure time, ISP settings, color accuracy (e.g., just noticeable difference), color fidelity, color or monochromatic, pixel binning in analog domain, sensor read out mode, ISP blocks, ROI or full frame FoV, streaming, etc., can be adjusted alone or in combination for the camera.

In some implementations, identified tasks have various image-based requirements that are adjusted. For example, resolution, SNR, color, multi exposure bracketing (e.g., dynamic range), region of interest (ROI) or full Field of view (FoV), correlated double sampling, dynamic bit depth, analog bending mode, well capacity adjusting, etc. can be adjusted alone or in combination for the task. For example, if gaze tracking is enabled, the resolution can be adjusted (e.g., increased) for a specific region of interest instead of capturing a complete high resolution image. Alternatively, if the camera image requirement is low quality, the bit depth can be reduced depending on the task.

In some implementations, identified tasks have image processing-based requirements that are adjusted. For example, the camera settings for camera electronics such as the image signal processor (ISP) are adjusted to run more efficiently for that identified task. Accordingly, not only for camera parameters as to how the image is taken, but also the captured image processing settings are adjusted.

In some implementations, the ISP performs one or more of the following techniques: noise reduction, auto white-balance and color correction, color interpolation (e.g., demosaicing), lens shading correction, defective pixel correction, gamma correction, local tone mapping, auto exposure, or auto-focus, sequentially or in combination, to deliver a resulting image or images for a particular camera sensor and use-case. Accordingly, when it is known that a particular task only needs a region of interest and the image quality can be very low, various components of the image processing pipeline (e.g., ISP) can be deactivated and the resulting image still has sufficient quality to complete the task. For example, when only black and white image information is needed, selective color processing components in the ISP pipeline can be disabled to save power and the resulting image still has sufficient quality to complete the task without affecting the responsiveness for the user. In another example, the ISP can analyze specific image ROIs where target objects are located based on hints from previous processing or outside information (e.g., provided by the venue or crowdsourced from other users).

In some implementations, context and activity information includes location (e.g., geography), time of day (e.g., illumination) or general illumination condition, modeled scene information (e.g., temporally) or windows, mode of operations of an electronic device (e.g., power saving always on or active), applications or algorithms running (e.g., algorithms or algorithm blocks that require image data).

In some implementations, identified tasks/requirements and activity information are combined. In some implementations, activity information includes camera motion estimates or a user's amount of motion, or identified user motion types (e.g., standing, walking, sitting, lying down). In some implementations, examples of what the user is doing can be determined with sensors on the electronic device. For example, IMU data combined with pressure sensor data determines whether a user is standing or sitting. In some implementations, other sensors in the environment such as a watch contribute data to track user activities (e.g., hand or arm or body motions or images). In some implementations, detection of longer term activities such as engaging in a conversation or eating a meal guide the camera settings. Similarly, an understanding of the physical environment contributes to identifying user activities. Outside information can be used such as the user's routine/location (e.g., visit a gym at 7 AM, walk to lunch at noon, or shopping at a usual time on Saturday).

In some implementations, an electronic device uses context and historical information about camera parameter usage and context to adjust camera settings. For example, the electronic device determined how to effectively capture images based on the context (e.g., location/activity understanding) for a selected imaging task in a given physical environment location a week ago. Today, the current context is used to recognize the similarity of a related or identical current imaging task in the same physical environment location so the electronic device can learn from or re-use camera parameters based on the effectiveness of the previous week old images or other historical images in the same environment for that task. In some implementation, the historical information was from activities that occurred years, months, days, or minutes in the past. In some implementations, the context and historical information is stored locally or stored remotely but accessible to the electronic device.

In some implementations, historical information for an identified imaging task can be included in the current context and used to adjust or preconfigure the camera for a current duplicate task. For example, two days ago camera parameters were adjusted over a series of images before generating an acceptable image of object at 5:00 PM. Then, two days later at 5:00 PM when the user is at the same location oriented at the same object, the two day old parameters that resulted in the acceptable image of the object are identified and used in an initial image capture of the object. For example, the context is the object A, which is located in a dark corner of the room or backlit by a window in the room, and the historical parameters ultimately used to capture the two day old satisfactory image of the object A, are a basis for future in time camera parameters of the electronic device when the context indicates an image of the object A is needed.

In some implementations, historical information for a desired task includes an identity of the object A (e.g., white plate on a dark table top) with its location, which includes a size, color, or contrast relative to a background, which allows the electronic device to determine parameters such as resolution and lighting that should be used to capture the identified object A image.

In some implementations, the physical environment is registered to a model such as a 3D point cloud representing the physical environment (e.g., using computer vision techniques such as VIO or SLAM). For example, the user's home could be a well known physical environment that is registered to an extensive detailed XR 3D environment. In one example, each room of the user's home is a physical environment that is registered to a XR 3D environment. In these conditions the camera of the electronic device is registered to the physical environment using the XR 3D environment and imaging task information is attached to the XR 3D environment to provide camera setting recommendations for specific tasks at specific locations in the physical environment (e.g., office or kitchen in the user's home).

In some implementations, the imaging task information attached to the XR 3D environment depends on camera location, depends on the time, depends on orientation or direction, or depends on whatever additional information is known to the electronic device. For example, smart appliances or a home controller (e.g., application or home automation hub) would know whether lamps or artificial lights were turned on in a room. Smart speakers can supply weather or additional information. In another example, because of the XR 3D environment for a room, the camera uses the context that the user is positioned in front of a window, facing and looking out the window and the sun is shining when a specific imaging task occurs.

In some implementations, imaging task information attached to a XR 3D environment corresponding to a location in the physical environment is based on GPS or satellite data. Alternatively, the imaging task information attached to a XR 3D environment corresponding to a location in a physical environment is based on other communication systems such as WiFi, Bluetooth or cellular data positioning. Further, various positioning methods for these different types of sensor data can be used such as proximity tracking relative to a beacon or trilateration techniques.

Figure 1:
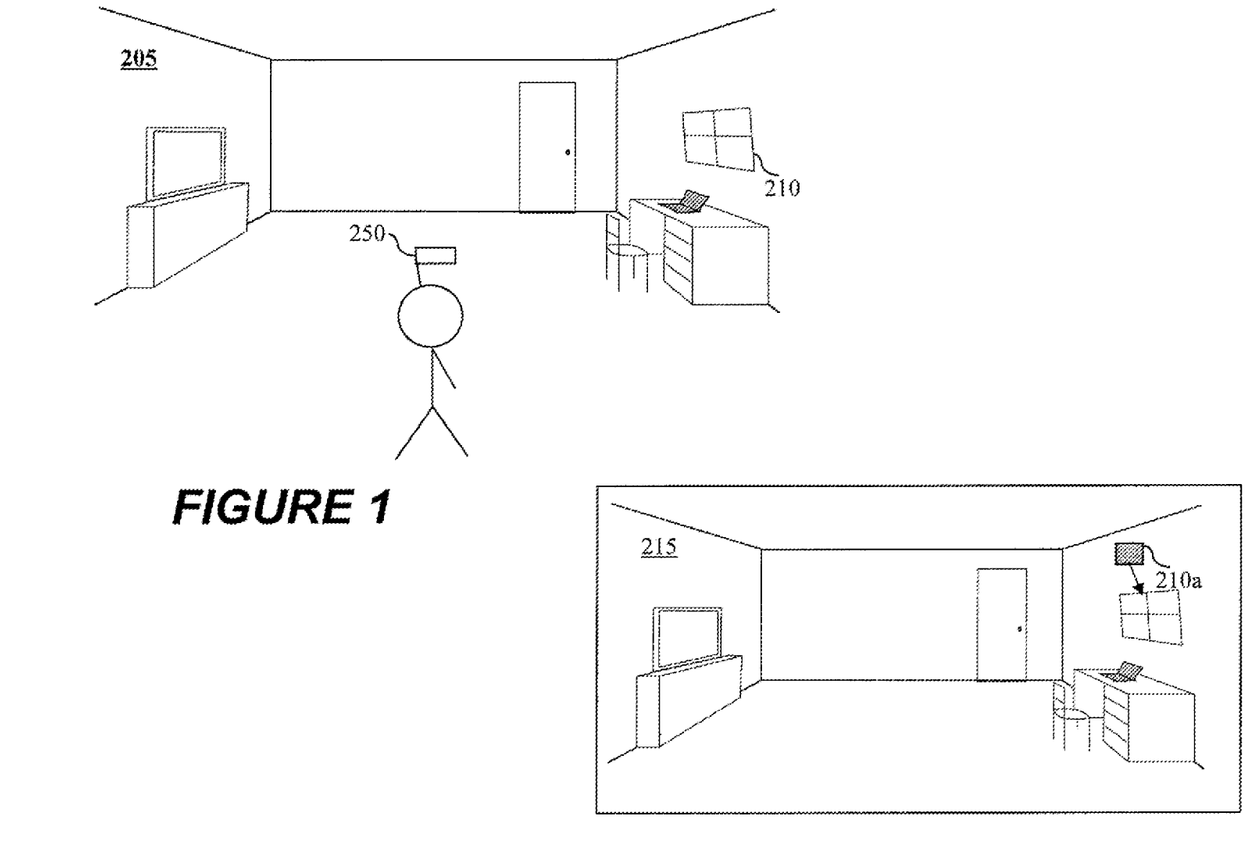
FIGS. 1-2 illustrates an electronic device within a physical environment at different points in time in accordance with some implementations.

FIG. 1 illustrates an electronic device 250 within a physical environment 205 at a first point in time. The physical environment 205, in this example, is a room or an office within a house. The electronic device 250 is configured to generate a 3D XR environment 215 based on images and/or other sensor data of the physical environment 205. The 3D XR environment 215 may be determined using various techniques, e.g., 3D point clouds, scale-invariant features, computer vision-based localization, simultaneous localization and mapping (SLAM), visual inertial odometry (VIO), etc. and may be based on sensor data, e.g., image data, depth data, motion data, audio data, semantic data, flicker sensor, ambient light sensor, etc. The location of the electronic device 250 is registered to the 3D XR environment 215.

In some implementations, the 3D XR environment 215 contains imaging task information (e.g., camera parameters and context such as time of day) based on previous particular imaging tasks that occurred in a specific area and their corresponding outcomes. As shown in FIG. 1, imaging task information 210a based on the context of orientation toward and within a set distance of an exterior window 210 for a previous imaging task (namely, capturing a picture of a pet in the yard outside the window 210) is attached to the 3D XR environment 215.

Figure 2:
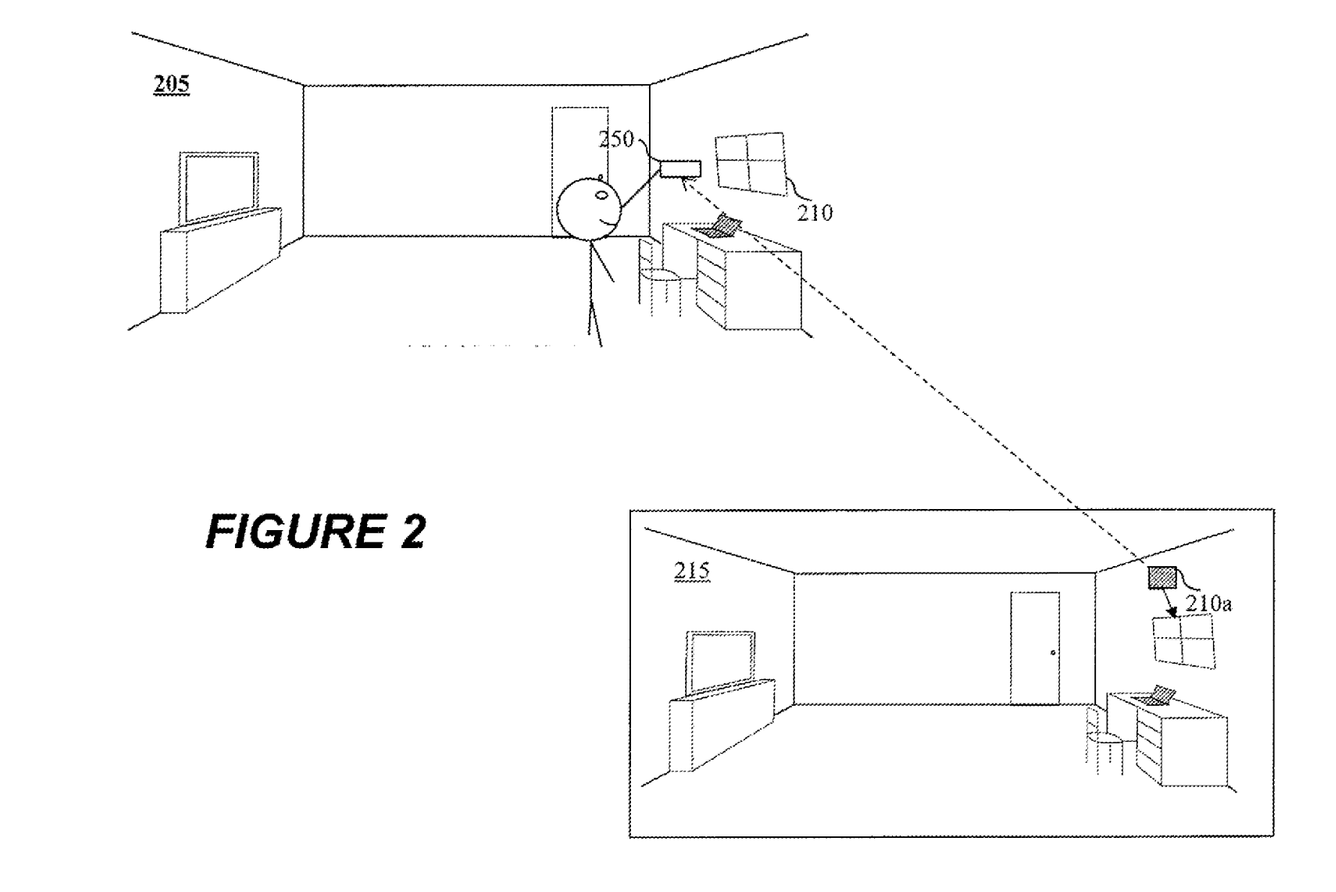

FIG. 2 illustrates the electronic device 250 within the physical environment 205 at a second subsequent point in time. As shown in FIG. 2, when the current context indicates the electronic device 250 is oriented toward and within the set distance of the exterior window 210 and the user of the electronic device 250 says "virtual assistant, take a picture of the pet", the current context prompts the electronic device 250 to access the imaging task information 210a and pre-adjust camera properties for the current pet picture based on imaging task information 210a.

In some implementations, the imaging task information attached to the XR 3D environment includes the predicted camera parameters for a particular task in that specific area and a recommended adjustment based on the results of previous identical or related imaging tasks at that location to generally improve the results of that particular task in that specific area over time. The historical adjustment is based on knowing whether previous image captures were successful for the corresponding imaging tasks. Over time, such historical adjustments can reduce a number of images taken for a specific imaging task, increase responsiveness, or reduce latency for the imaging task based on the context and the historical adjustments.

Thus, the imaging task information attached to the XR 3D environment for a set time of day can include (i) predicted camera parameters (e.g., exposure time) for a particular task in that specific area and (ii) an additional recommendation that further modifies the predicted camera parameters based on historical outcomes (e.g., change one or more parameters because last time the particular task in that specific area did not work or can be improved).

In some implementations, the context and historical information for an imaging task attached to the 3D XR environment 215 corresponding to a physical location of the electronic device 250 includes predicted camera parameters (e.g., exposure time) for a particular task in that specific area camera location, captured by a different electronic device (e.g., by another user) or otherwise available as prior information (e.g., supplied by a venue to its visitors).

In some implementations, imaging task information includes camera parameters for a particular task in that specific area based on shared camera parameters obtained based on current identical or similar imaging tasks at that location by another person (e.g., a different electronic device). Thus, part of the context used to adjust camera parameters or settings includes other concurrent user experiences in the same or similar imaging task in the same location. For example, when a first electronic device can determine how to effectively capture images (e.g., adjusted camera parameters) based on the context (e.g., location/activity understanding) for a selected imaging task that information is transmitted to a second electronic device in the same physical environment location performing or about to perform the same imaging task.

For example, when the imaging task is to decode a QR code outside above the roof of a restaurant, different users with their electronic devices may be adjacent, nearby, or on opposite sides of a road, and the camera parameters (e.g., context, settings, and algorithm types) used to capture the image(s) of the QR code are directly concurrently shared between two or more electronic devices. For example, imaging task information such as successful camera parameters is shared based on GPS position of the QR code or the different electronic device users. In some implementations, camera parameters are shared between electronic devices with the identical context (e.g., same exact location, orientation, and cameras).

Alternatively, the imaging task information is shared between different users performing the same imaging tasks at the same location may occur at different times. Thus, the imaging task information shared between different users for particular imaging tasks that occurred in a specific area may be from an earlier or concurrent occurrence of the imaging task. In some implementations, the imaging task information shared between different users is based on identical, similar, or different (i) sensors, (ii) cameras, (iii) imaging capture/processing algorithms, or (iv) imaging components such as the ISP. In some implementations, the imaging task information shared between different users includes a quantitative or qualitative indication of success of the camera parameters. In some implementations, the imaging task information shared between different users performing the same imaging tasks at the same location is based on GPS or satellite data or other communication systems such as WiFi, Bluetooth or cellular data or the like. Further, various positioning methods for these different types of positioning data can be used such as proximity tracking relative to a beacon or triangulation/trilateration techniques.

Accordingly, over time the shared imaging task information can reduce a number of images taken for a specific imaging task, increase responsiveness, or reduce latency for the imaging task based on the context and the historical adjustments.

In some implementations, the shared imaging task information is attached to an XR environment includes the predicted camera parameters for a particular task in that specific area based on the results of current identical imaging tasks or previous identical imaging tasks at that location by another person (e.g., a different electronic device).

Figure 3:
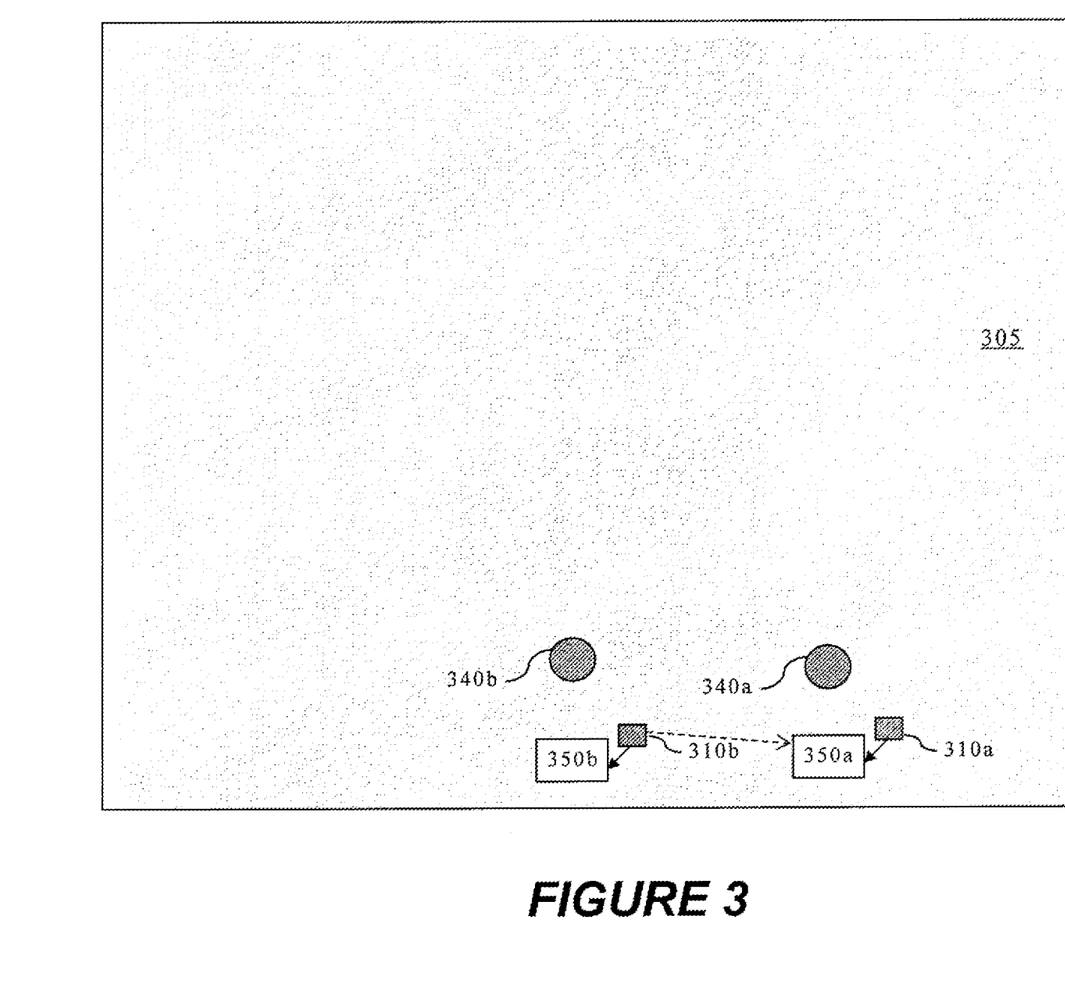
FIGS. 3-4 illustrates a second electronic device sharing context specific information with a first electronic device and the first electronic device adjusts camera parameters in a matching context in accordance with some implementations.
Figure 4:
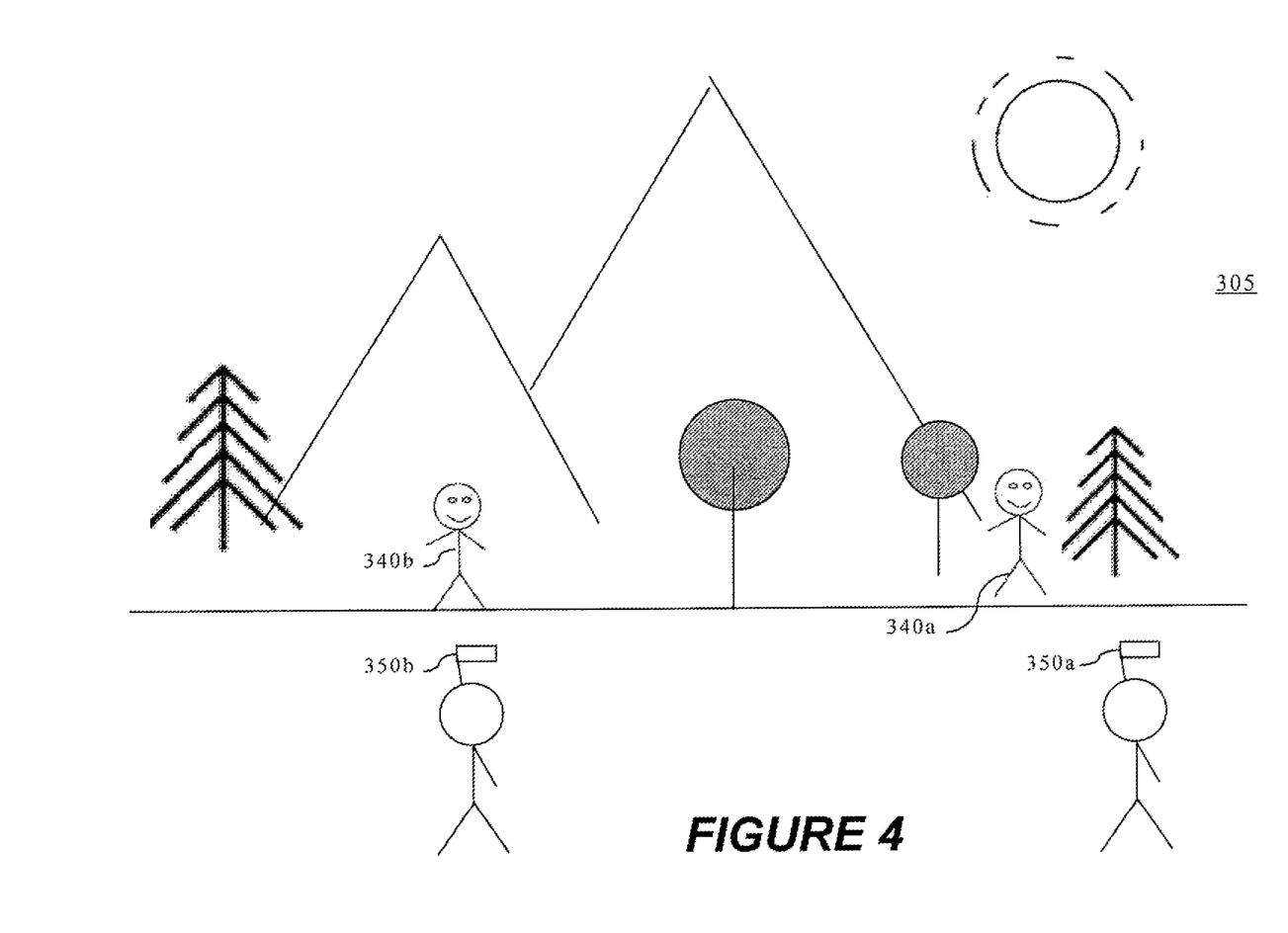

FIGS. 3-4 illustrate a second electronic device sharing context specific information with a first electronic device so that the first electronic device makes camera parameter adjustments in a matching context for the same identified imaging task. As shown in FIGS. 3-4, the second electronic device 350b is performing the same context specific imaging task within a physical environment 305 as a first electronic device 350a. For example, the physical environment 305, in this example, is an outdoor park with a scenic view. For example, the context specific information 310b includes selected camera parameters used to successfully capture a scenic image including a person 340b in the same location of the physical environment 305 and environmental conditions (e.g., lighting, etc.). In some implementations, the second electronic device 350b provides, transmits, or allows the first electronic device to access the context specific information 310b, which is used to and pre-adjust camera properties used to successfully capture a scenic image including a person 340a in the same location of the physical environment 305 and environmental conditions. Thus, the first electronic device 350a uses the shared context specific information 310b to reduce a number of images taken for a specific imaging task, increase responsiveness, reduce latency for the imaging task, and/or reduce the number of sensors to activate to determine the correct parameters for the imaging task (thereby reducing power consumption of the electronic device).

In some implementations, the first electronic device 350a or the second electronic device 350b is configured to generate a 3D XR environment based on images and/or other sensor data of the physical environment 305. The 3D XR environment may be determined using various techniques, e.g., 3D point clouds, scale invariant features transform, computer vision-based localization, simultaneous localization and mapping (SLAM), visual inertial odometry (VIO), etc. and may be based on semantic data, sensor data, e.g., image data, depth data, motion data, audio data, ambient light sensor, flicker sensor, etc. The first electronic device 350a or the second electronic device 350b can be registered to the 3D XR environment. In some implementations, the shared context specific information (e.g., 310a, 310b) is attached to the 3D XR environment and accessible to subsequent electronic devices at that specific location in the physical environment 305.

In some implementations, the camera parameters (e.g., image capture parameters) for a specific task are not estimated by sensing the lighting conditions but estimated by determining the location, current weather, time of year, solar elevation, and time of day to estimate the brightness. Thus, sensors that have reduced power consumption may be used to generate a different set of data to fit into the image capture parameters estimation. For example, some implementations use non-image sensors (e.g., IMU, direction, or time of day) or location (e.g., GPS or modeled physical environment) to understand the current context. In one example, the camera parameters previously used to accomplish a task can be related to the lighting environment (e.g., brightness) and then correlated to other different sensor data such as the time of day (e.g., sunlight, moonlight, starlight), home controller, etc.

In some implementations, sensors on the electronic device are prioritized by power consumption. In some implementations, sensors that are already enabled on the electronic device are prioritized. For example, IMU, depth, or GPS sensors may be enabled on the electronic device and therefore can be used without additional power consumption. Accordingly, power use can be reduced by adjusting camera settings for a specific task to prioritize low power or already enabled sensors while the quality of the user experience is maintained (e.g., responsiveness, task completion).

In some implementations, the camera has multiple different modes of operation, and when the current context is understood, we can set the appropriate mode of operation based on the identified context. For example, in a dark environment the camera parameters can be set accordingly. Alternatively, an amount of motion (e.g., either the user or the scene is moving) can change the mode of operation. In some environments, selected sensors (e.g., bright sunlight or GPS error too large) are inaccurate and accordingly, the mode of the operation can be adjusted. In some implementations, an electronic device with a plurality of cameras can select a single camera to use based on context (e.g., FoV, distance to an object).

In some implementations, different image processing algorithms are used. For example, a selected algorithm of a plurality of algorithms used to process the captured image(s) can be based on the current context and these specified tasks. Once again, for the example of decoding QR codes, under certain conditions, a single high quality image is captured. However, when extreme motion occurs over a preset threshold, the current context could select a different temporal algorithm where a burst of rapid images of the QR code are captured and then the temporal algorithm is used to determine and piece together a single decodable image of the QR code, using parts of each image of the burst of rapid images. Thus, from the context and the identified task, before any image is captured, multiple camera parameters are adjusted, and/or image capture/processing techniques are adapted.

Figure 5:
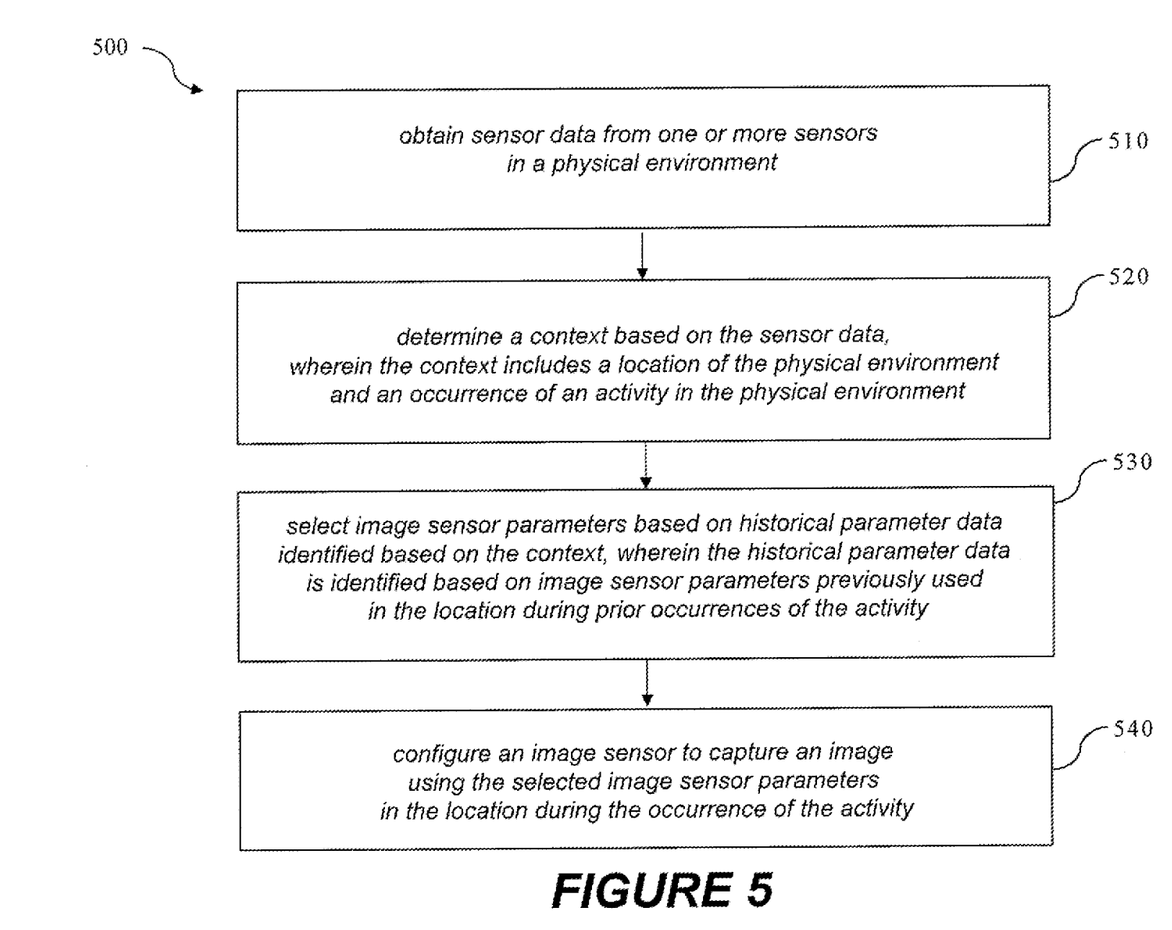
FIG. 5 is a flowchart illustrating an exemplary method that adjusts image sensor parameters based on context and historical information in accordance with some implementations.

FIG. 5 is a flowchart illustrating an exemplary method of adjusting image sensor parameters based on context (e.g., location/activity understanding) and historical information. In some implementations, the image sensor parameters include exposure time, resolution, bit depth, number of frames, gating, image processing algorithms, etc. The image sensor parameters may be modified for a particular purpose (e.g., associated with the user's identified activity). The image sensor parameters may be modified for reducing battery or image processing resource usage. Context is determined based on sensor data that identifies where the user is, what the user is doing (e.g., sitting, walking, standing, jogging, etc.), what the user is looking at, etc. In some implementations, the adjusted image sensor parameters are selected based on historical information regarding image sensor parameters that were used in the same physical location and during the same activity. In some implementations, the method 500 is performed by a device (e.g., electronic device 700 of FIG. 7). The method 500 can be performed using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed by an electronic device having a processor.

At block 510, the method 500 obtains sensor data from one or more sensors of an electronic device in a physical environment. In some implementations, the sensor data includes image data, depth data, computer vision data (e.g., SLAM/VIO), audio data, motion data, location data, user pose data, sensor pose data, etc. In some implementations, the sensor data is used to generate a 3D representation of the physical environment.

At block 520, the method 500 determines a context based on the sensor data, where the context includes a location of the physical environment and an occurrence of an activity in the physical environment. For example, the occurrence of an activity is a detected type of movement (e.g., lying down, sitting, standing, walking, jogging, etc.) by a user of the electronic device including a camera. In some implementations, the occurrence of the activity is a detected function (e.g., panoramic imaging, QR code reading, AppClipCode scanning, etc.) of the electronic device using one or more image sensors or cameras. In some implementations, the occurrence of the activity is a detected operation type of one or more sensors (e.g., IMU or RGB-D sensors, image processing blocks (face recognition), etc.) of the electronic device. For example, different operation types of activities may correspond to different expected amounts of camera movement or different expected speeds of camera movement. The location can be a public or private location such as an airport, a national park, a playground, or the like. In some implementations, the context of the location of the physical environment includes additional location-specific information including time of day, time of year, weather conditions, location-specific metadata, or state of illumination source (e.g., light on/off, window open/closed), etc. In some implementations, the location of the physical environment is a modeled 3D environment (e.g., office or local park/restaurant). For example, the location of the physical environment is a well-known, previously and repeatedly modeled 3D environment (e.g., rooms in the user's house).

In another example, the modeled 3D environment includes additional information (e.g., statistics on imaging algorithms and processing outcomes, camera parameters, ISP parameters, semantic information, user added) attached to a 3D mesh or point cloud representing the physical environment.

In some implementations, the context includes information such as, but not limited to location, time of day (lighting), user body motion estimate, scene information (e.g., artificial light locations, windows) of well-known or previously modeled physical environments, mode of operation of the electronic device, or applications executing on the electronic device. The context may be determined using application data or sensor data from other electronic devices (e.g., watch, smart phone, tablet) operated by the same user.

At block 530, the method 500 selects image sensor parameters based on historical parameter data identified based on the context, where the historical parameter data is identified based on image sensor parameters previously used in the location during prior occurrences of the activity. In some implementations, the historical parameter data is identified based on historical information of corresponding results for the image sensor parameters (e.g., that worked or did not work) at the location during prior occurrences of the activity. Thus, image sensor parameters that worked at the location during prior occurrences of the activity are selected. The prior occurrences of the activity include a single current visit to the location, a single previous visit to the location, or more than one previous visit to the location.

In some implementations at block 530, the prior occurrences of the activity at the location are performed by the same electronic device. Alternatively, the prior occurrences of the activity at the location are performed by one or more electronic devices different from the electronic device. For example, the historical parameter data may be from other electronic devices operated by different users (e.g., including the same sensors, algorithms, image sensor, or camera).

At block 540, the method 500 configures an image sensor to capture an image using the selected image sensor parameters in the location during the occurrence of the activity. For example, during a previous occurrence of the activity at the location, the camera captured 10 images using various selected camera parameters and the third image of the 10 images resulted in the highest quality image and with sufficient quality for the activity (e.g., read a QR code, face recognition, photograph a pet in a dark corner of a home office). In this example, during a current occurrence of the activity at the location, the camera uses the settings of the third image of the previous occurrence and thus a single image is captured with sufficient quality for the activity. Thus, in some implementations, fewer images or a single image are captured in the location during the occurrence of the activity based on one or more previous occurrences of the activity at the location (e.g., historical information).

In some implementations at block 540, during a previous occurrence of the activity at the location, the camera captured a previous image using a first algorithm based on previous selected camera parameters, where during the occurrence of the activity at the location, the camera captured the image using a second different algorithm (e.g., with reduced power consumption relative to the first algorithm) selected based on the previous selected camera parameters to capture the image with the same or equivalent quality as the previous image.

In some implementations, blocks 510-540 are repeatedly performed. In some implementations, the techniques disclosed herein may be implemented on a smart phone, tablet, or a wearable device, such as an HMD having an optical see-through or opaque display.

Figure 6:
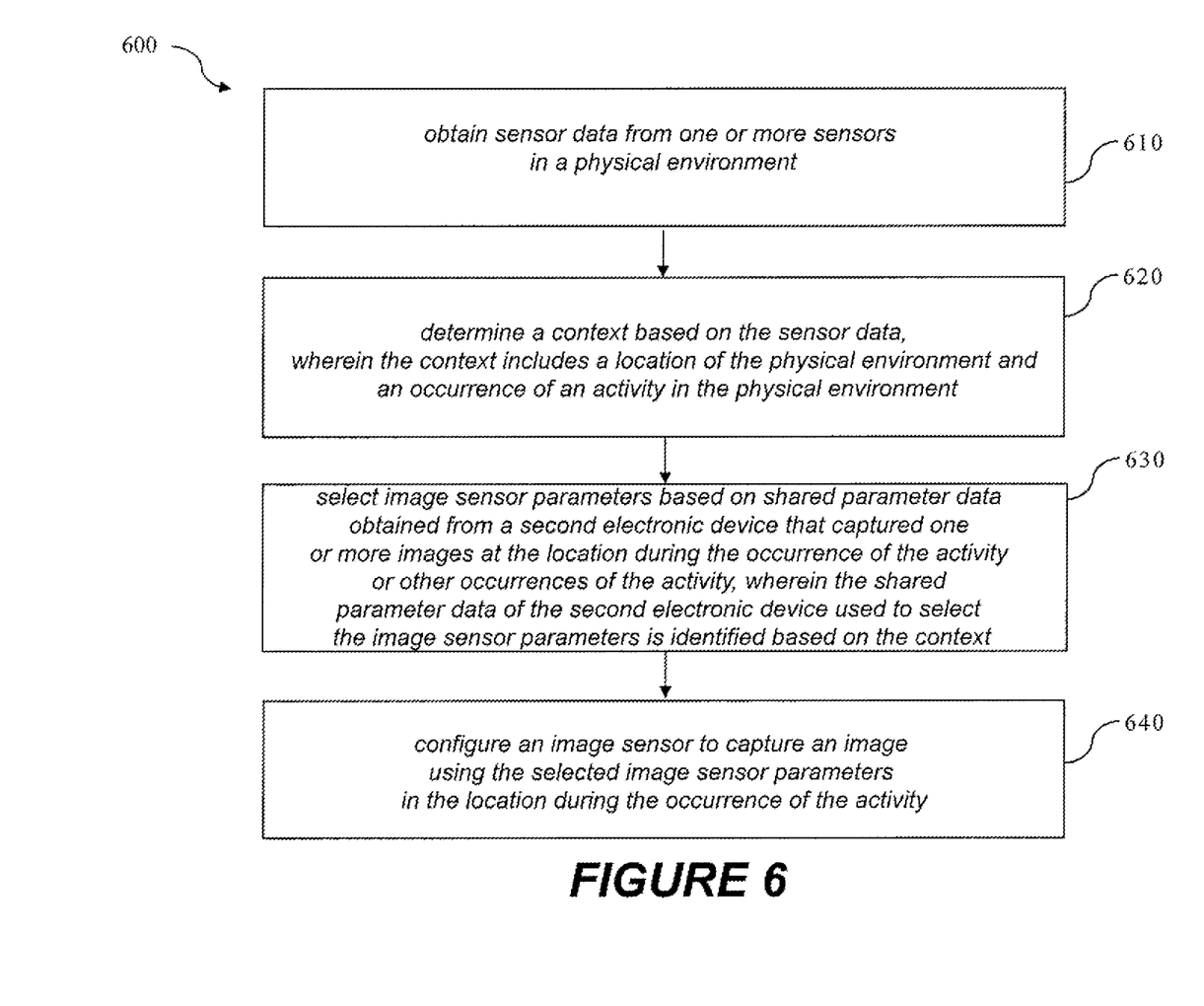
FIG. 6 is a flowchart illustrating an exemplary method that adjusts image sensor parameters based on context and shared information in accordance with some implementations.

FIG. 6 is a flowchart illustrating an exemplary method of adjusting image sensor parameters based on context (e.g., location/activity understanding) and shared information. In some implementations, the image sensor parameters include exposure time, resolution, bit depth, field of view, read out mode, number of frames, image processing algorithms, etc. For example, the image sensor parameters are selected for a particular purpose (e.g., associated with the user's identified activity). The image sensor parameters may be modified for reducing battery or image processing resource usage. Context is determined based on sensor data that identifies where the user is, what the user is doing (e.g., sitting, walking, standing, jogging, etc.), what the user is looking at, etc. In some implementations, the adjusted image sensor parameters are selected based on shared information regarding image sensor parameters that were used in the same physical location and during the same activity. In some implementations, the method 600 is performed by a device (e.g., electronic device 700 of FIG. 7). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory). In some implementations, the method 600 is performed by an electronic device having a processor.

At block 610, the method 600 obtains sensor data from one or more sensors of an electronic device in a physical environment. In some implementations, the sensor data includes image data, depth data, computer vision data, audio data, motion data, location data, user pose data, or sensor pose data (see for example, block 510).

In some implementations, the context includes location, time of day (lighting), user body motion estimate, enrolled scene information (windows), mode of operation of the electronic device, or applications executing on the electronic device.

At block 620, the method 600 determines a context based on the sensor data, where the context includes a location of the physical environment and an occurrence of an activity in the physical environment. For example, the location is an airport, a national park, a playground, or the like. For example, the occurrence of an activity is a detected type of movement (e.g., lying down, sitting, standing, walking, jogging, etc.) by a user of the electronic device including a camera. In some implementations, the occurrence of the activity is a detected function (e.g., panoramic imaging, QR code reading, etc.) of the electronic device using one or more image sensors (see for example, block 520). For example, the location of the physical environment is a well-known, previously and repeatedly modeled 3D environment (e.g., rooms in the user's house). In another example, the modeled 3D environment includes additional information (e.g., imaging algorithms, camera parameters, semantic information, user added) attached to a 3D mesh or point cloud representing the physical environment.

In some implementations, the context includes information such as, but not limited to location, time of day (lighting), time of year, geolocation, user body motion estimate, scene information (e.g., artificial light locations, windows of modeled physical environments), mode of operation of the first electronic device or the second electronic device, or applications executing on the first electronic device or the second electronic device. The context may be determined using application data or sensor data from other electronic devices (e.g., watch, smart phone, tablet) operated by the same user of the first electronic device or the second electronic device.

At block 630, the method 600 selects image sensor parameters based on shared parameter data obtained from a second electronic device that captured one or more images at the location during the occurrence of the activity or other occurrences of the activity, where the shared parameter data of the second electronic device used to select the image sensor parameters is identified based on the context. For example, the shared parameter data of the second electronic device used to select the image sensor parameters is based on determining that a user of the second electronic device is/was in a particular room doing a particular activity (that the user of the first electronic device is doing) and information about successful image sensor parameters used in that particular room for that particular purpose are shared (e.g., provided to the first electronic device). Thus, the shared parameter data is identified based on information of corresponding results for the second electronic device for the image sensor parameters (e.g., that worked or did not work) at the location during occurrences of the activity. Thus, image sensor parameters that worked at the location for the second electronic device during occurrences of the activity are selected (e.g., for use by the first electronic device). In some implementations, the occurrence of the activity or the other occurrences of the activity resulted from a single current visit to the location, a single previous visit to the location, or more than one previous visit to the location by the second electronic device.

In some implementations at block 630, the method 600 selects image sensor parameters based on shared parameter data obtained from more than one additional electronic device that captured one or more images at the location during the occurrence of the activity or other occurrences of the activity, where the shared parameter data from the more than one additional electronic device used to select the image sensor parameters is identified based on the context.

At block 640, the method 600 configures an image sensor to capture an image using the selected image sensor parameters in the location during the occurrence of the activity. For example, during an occurrence (e.g., previous or concurrent) of the activity at the location, a camera of the second electronic device captured multiple burst of images using various different camera parameters and the first image of the second burst of images resulted in the highest quality image for the activity and with sufficient quality for the activity (e.g., read a QR code, take a panoramic picture of a waterfall, take a picture of a painting in a museum). In this example, during an occurrence (e.g., concurrent or subsequent) of the activity at the location, a single image is captured with sufficient quality for the activity by a camera of the first electronic device based on shared parameter data obtained from the first image of the second burst of images from the camera of the second electronic device. Thus, in some implementations, fewer images or a single image are captured by the camera of the first electronic device in the location during the occurrence of the activity based on shared information obtained from one or more occurrences of the activity at the location by the second electronic device. Thus, the camera of the first electronic device can adjust camera parameters to capture an image in the location during the occurrence of the activity based on context and shared information.

In some implementations at block 640, during the one or more occurrences of the activity at the location, the camera of the second electronic device captured various images using a first algorithm based on selected camera parameters, where during the occurrence of the activity at the location, the camera of the first electronic device captured the image using a second different algorithm (e.g., with reduced power consumption relative to the first algorithm) based on the selected camera parameters based on the shared parameter data obtained from the second electronic device to capture the image with the same or equivalent quality for the activity.

In some implementations, blocks 610-640 are repeatedly performed. In some implementations, the techniques disclosed herein may be implemented on a smart phone, tablet, or a wearable device, such as an HMD having an optical see-through or opaque display.

A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the electronic device presenting the XR environment is a single device that may be hand-held (e.g., mobile phone, a tablet, a laptop, etc.) or worn (e.g., a watch, a head-mounted device (HMD), etc.). In some implementations, functions of the electronic device are accomplished via two or more communicating (e.g., wired or wireless) devices, for example additionally including an optional base station. Other examples include a laptop, desktop, server, or other such device that includes additional capabilities in terms of power, CPU capabilities, GPU capabilities, storage capabilities, memory capabilities, and the like.

Figure 7:
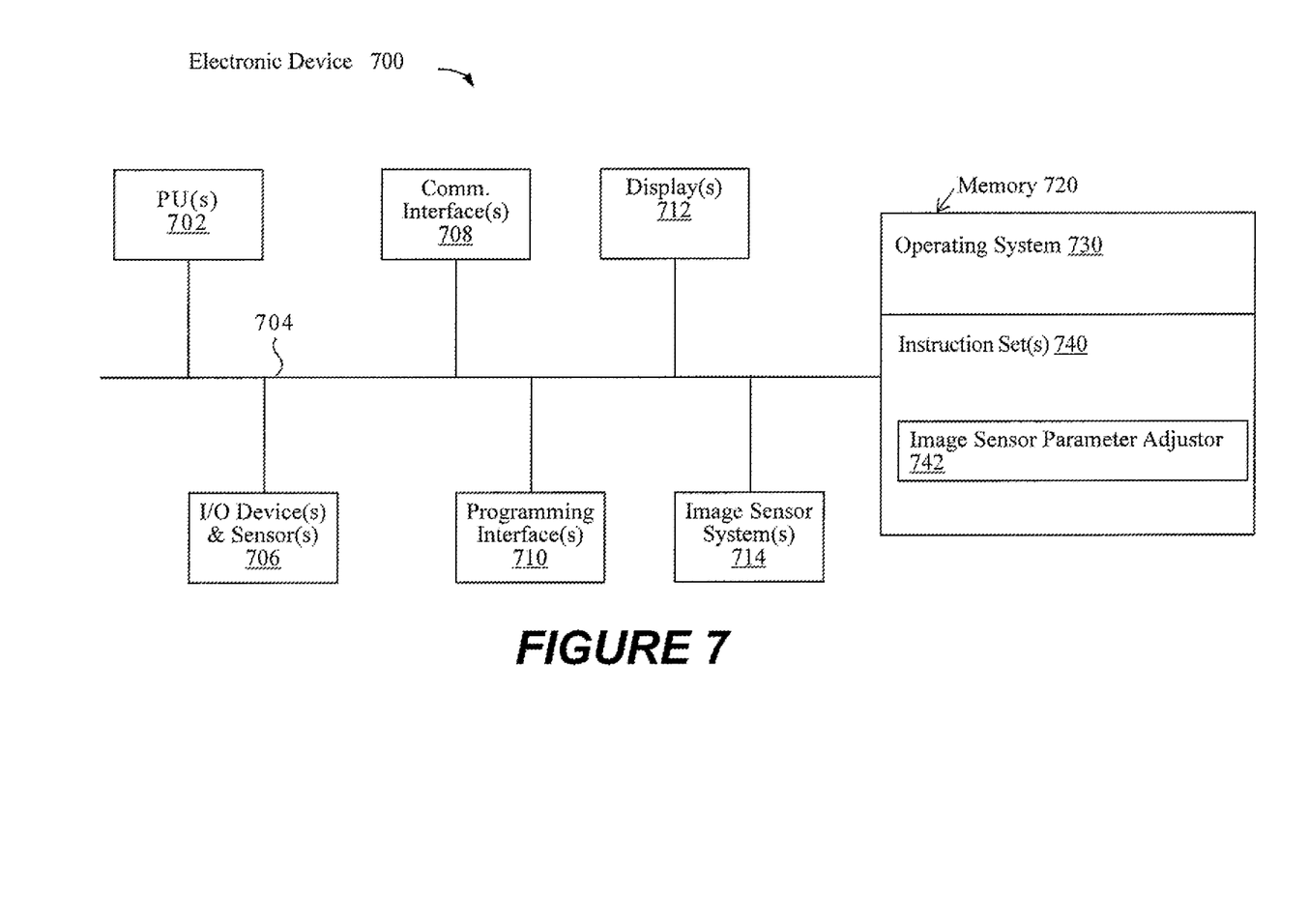
FIG. 7 illustrates an exemplary electronic device in accordance with some implementations.

FIG. 7 is a block diagram of an example device 700. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, one or more interior or exterior facing sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present content to the user. In some implementations, the one or more displays 712 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the electronic device 700 may include a single display. In another example, the electronic device 700 includes a display for each eye of the user.

In some implementations, the one or more interior or exterior facing sensor systems 714 include an image capture device or array that captures image data or an audio capture device or array (e.g., microphone) that captures audio data. The one or more image sensor systems 714 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 714 further include an illumination source that emits light such as a flash. In some implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

In some implementations, the instruction set(s) 740 include an image sensor parameter adjustor 742 that is executable by the processing unit(s) 702 to adjust camera parameters based on context and historical information or shared information according to one or more of the techniques disclosed herein.

Although the instruction set(s) 740 are shown as residing on a single device, it should be understood that in other implementations, any combination of the elements may be located in separate computing devices. FIG. 7 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
obtaining sensor data from one or more sensors in a physical environment;
based on the sensor data, determining an occurrence of a user motion type in the physical environment;
selecting image sensor parameters based on historical parameter data identified based on the user motion type, wherein the historical parameter data is identified based on shared image sensor parameters from at least one additional electronic device differing from the electronic device, the at least one additional electronic device previously used in a location in the physical environment during prior occurrences of the user motion type; and
configuring an image sensor to capture an image using the selected image sensor parameters in the location during the occurrence of the user motion type.

2. The method of claim 1, further comprising:
determining a context based on the sensor data, wherein the context includes location, time of day, user body motion estimate, scene information of a physical environment, mode of operation of the electronic device, or applications executing on the electronic device, and wherein said selecting the image sensor parameters is further based on the context.

3. The method of claim 1, wherein the historical parameter data is identified based on historical information of corresponding results for the image sensor parameters at the location during prior occurrences of the user motion type.

4. The method of claim 1, wherein the prior occurrences of the user motion type resulted from a single current visit to the location, a single previous visit to the location, or more than one previous visit to the location.

5. The method of claim 1, wherein the prior occurrences of the user motion type at the location each included the electronic device or the prior occurrences of the user motion type at the location included one or more electronic devices different from the electronic device or outside prior information.

6. The method of claim 1, wherein the occurrence of the user motion type in the physical environment is an orientation and detected type of movement by a user of the electronic device or the occurrence of the user motion type in the physical environment is associated with a detected operation type of one or more sensors of the electronic device.

7. The method of claim 1, wherein during a previous occurrence of the user motion type at the location, the image sensor captured a plurality of images using previous selected image sensor parameters.

8. The method of claim 1, wherein during a previous occurrence of the user motion type at the location, the image sensor captured the image using a first algorithm based on previous selected image sensor parameters, wherein during the occurrence of the user motion type at the location, the image sensor captured the image using a second different algorithm selected based on the selected image sensor parameters.

9. The method of claim 1, wherein the location of the physical environment is an enrolled 3D environment.

10. The method of claim 1, wherein the sensor data comprises image data, depth data, 3D point clouds, scale-invariant features, computer vision data, audio data, semantic data, motion data, location data, user pose data, or sensor pose data.

11. The method of claim 1, wherein a context is associated with the location of the physical environment and comprises additional location-specific information including time of day, time of year, or weather conditions.

12. The method of claim 1, wherein the user motion type comprises walking sitting, jogging, laying down, standing, or executing hand, arm, or body motions.

13. The method of claim 1, wherein the user motion type is associated with a motionless activity.

14. A method comprising:
at a first electronic device having a processor:

obtaining sensor data from one or more sensors in a physical environment;

based on the sensor data, determining an occurrence of a user motion type in the physical environment;

selecting image sensor parameters based on historical parameter data identified based on the user motion type, wherein the historical parameter data is identified based on shared image sensor parameters from at least one additional electronic device differing from the electronic device, the at least one additional electronic device previously used in a location in the physical environment during prior occurrences of the user motion type; and configuring an image sensor to capture an image using the selected image sensor parameters in the location during the occurrence of the user motion type.

15. The method of claim 14, wherein shared parameter data is obtained from a second electronic device and is identified based on corresponding results for the image sensor parameters at the location during occurrences of the user motion type.

16. The method of claim 14, wherein the occurrence of the user motion type or the other occurrences of the user motion type resulted from a single current visit to the location, a single previous visit to the location, or more than one previous visit to the location by a second electronic device.

17. The method of claim 14, wherein the occurrence of the user activity type is at the location in the physical environment and is an orientation and detected type of movement by a user of the first electronic device or the occurrence of the user motion type at the location in the physical environment is a detected operation type of one or more sensors of the first electronic device.

18. The method of claim 14, wherein during a previous occurrence of the user motion type at the location, an image sensor of a second electronic device captured a plurality of images using previous selected image sensor parameters.

19. The method of claim 14, wherein during a previous occurrence of the user motion type at the location, an image sensor of a second electronic device captured the image using a first algorithm based on previous selected image sensor parameters, wherein during the occurrence of the user motion type at the location, the image sensor of the first electronic device captured the image using a second different algorithm selected based on the selected image sensor parameters.

20. A system comprising:

memory; and one or more processors at a device coupled to the memory, wherein the memory comprises program instructions that, when executed on the one or more processors, cause the system to perform operations comprising:

obtaining sensor data from one or more sensors in a physical environment;

based on the sensor data, determining a context based on the sensor data, wherein the context comprises an occurrence of a user motion type in the physical environment;

selecting image sensor parameters based on historical parameter data identified based on the user motion type, wherein the historical parameter data is identified based on shared image sensor parameters from at least one additional electronic device differing from the electronic device, the at least one additional electronic device previously used in a location in the physical environment during prior occurrences of the user motion type; and configuring an image sensor to capture an image using the selected image sensor parameters in the location during the occurrence of the user motion type.

* * * * *